UNITED STATES PATENT OFFICE.

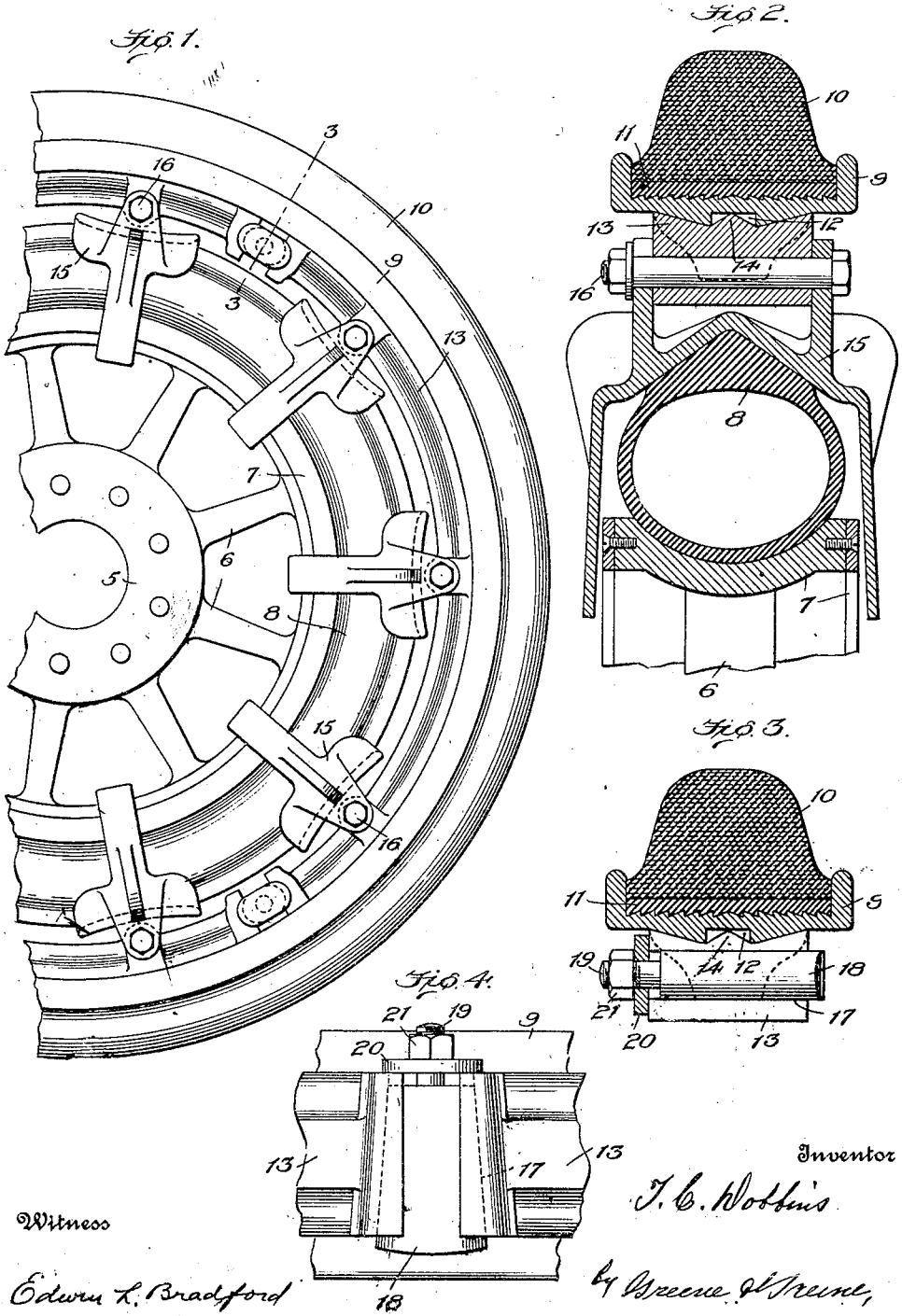

TIMOTHY C. DOBBINS, OF HUNTINGTON PARK, CALIFORNIA.

VEHICLE-WHEEL.

1,304,165. Specification of Letters Patent. Patented May 20, 1919.

Application filed August 22, 1916, Serial No. 116,221. Renewed April 14, 1919. Serial No. 290,073.

*To all whom it may concern:*

Be it known that I, TIMOTHY C. DOBBINS, a citizen of the United States, and resident of Huntington Park, in the county of Los Angeles and State of California, have invented certain new and useful Improvements in Vehicle-Wheels, of which the following is a specification, reference being had therein to the accompanying drawing.

The object of this invention is to provide a wheel having a novel rim which may be readily attached and detached. The devices are shown as embodied in or applied to a wheel of peculiar construction not herein claimed *per se*.

In the accompanying drawings,

Figure 1 is a side elevation of a portion of a wheel provided with the novel devices.

Fig. 2 is a radial section of the outer portion of the wheel.

Fig. 3 is a section on the line 3—3, Fig. 1.

Fig. 4 is a view looking radially outward, toward the rim, in the line of the section 3—3.

In these figures, 5 represents the hub, 6 the spokes, 7 the rim and 8 a pneumatic tire, the whole constituting a wheel center without novelty. Concentric with and at some distance from the center is an annular structure consisting of a trough-like member 9 in which is mounted a tire-like structure 10 made up of gradually narrowing concentric layers of canvas united by cement, preferably saturated with rubber and vulcanized together and to a hard rubber base 11 having its inner face serrated and engaged with corresponding serrations on the member 9, the teeth of that member all being inclined toward the medial line of the wheel, as shown. The member 9 is centrally thickened on its inner side so that this portion is a flattened V in cross-section, and is provided along the middle of this thickened portion with a groove 12. Against the thickened portion of the member 9 fits a divided metal ring 13 having a central V-shaped projection 14 extending into the groove 12, and at short intervals around this rim are mounted forked shoes 15 which rock freely on bolts 16 and rest upon the tire 8. The ring 13 is divided at any desired number of points, as shown at three points, and at each point the adjacent ends are enlarged to form ways 17 for a wedge 18 from the narrow end of which a threaded projection 19 extends through a washer 20, resting against the ring segments, and bears a nut 21 by which the wedge can be drawn between the adjacent ring ends forcing them apart and pressing the ring outward with great force against the member 9 whereby the entire structure outside the wheel center is secured in place, yet is quickly released for removal by loosening the nuts 21 and the wedges 18. The wheel relies for resiliency wholly upon the tire 8, and the canvas mass 10 is employed to avoid noise and deformation of the member 9 by impact upon stones and the like. Cemented layers of canvas secured to a hard rubber base in the trough-like member 9 is a very desirable structure which serves the purpose excellently and may be made a thick body, as shown, without danger of its becoming detached by lateral thrusts.

The projection 14 entering the groove 12 compels exact adjustment of the parts in the same plane when the divided ring is expanded.

What I claim is:

1. The combination with a resilient wheel center, of a transversely divided ring encircling the center, a rim encircling the divided ring, and means for forcibly separating the parts of the divided ring to expand the latter, said rim and ring being adapted to mutually engage and form a rigid unit when the ring is forcibly expanded.

2. The combination with a wheel center and a non-expansible concentric wheel rim spaced from the center, of an intermediate ring transversely divided into slightly separated segments adapted to engage and disengage the rim by radial movement and provided between the ends of the several segments with an annular series of forked projections normally in detachable sliding engagement with the center and holding the segments in the plane thereof, and means for forcing the segments apart; whereby the segments may at will form a rigid whole with the rim, or release the rim, or be removed, with the forked projections, from the center and rim.

3. The combination with a highly resilient wheel center, of a ring encircling the center and divided into segments having transverse ways on their adjacent ends, a rim encircling said ring, wedges fitting in said ways, and nuts arranged to force the advance of the wedges in said ways; said ring and rim being adapted to engage and seek the same plane as the ring expands under action of the wedges.

In testimony whereof I hereunto affix my signature.

TIMOTHY C. DOBBINS.